3,537,964
PHOTOCHEMICAL PROCESS FOR PREPARING ALICYCLIC OXIMES USING NITROSYLSULFURIC ACID
Shoichi Miwa, 27–70 Nakadai - 3 - chome, Itabashi-ku, Tokyo, Japan, and Shokichi Eiga, 27–6 Nakadai-3-chome, Itabashi-ku, Tokyo, Japan
No Drawing. Filed Jan. 23, 1968, Ser. No. 699,804
Claims priority, application Japan, Jan. 25, 1967, 42/4,588
Int. Cl. B01j 1/10; C07c 131/00
U.S. Cl. 204—162                                             2 Claims

ABSTRACT OF THE DISCLOSURE

A mixture of nitrosylsulfonic acid, sulfuric acid and hydrogen chloride is added to cycloalkane or a mixture of nitrosylsulfuric acid and sulfonic acid is added to cycloalkane saturated with hydrogen chloride, and then the resulting mixture is stirred to produce a homogeneous emulsion. The emulsion is exposed to light to take place photochemical reaction, thereby alicyclic oxime is obtained. The nitrosylsulfuric acid in the mixture amounts 70–10% by weight based on $NOHSO_4+H_2SO_4$, and the mixture further contains 2–25% by weight of water based on $NOHSO_4+H_2SO_4+H_2O$.

---

The present invention relates to a process for continuously preparing a corresponding aliphatic oxime by photochemical reaction of a cycloalkane. More particularly, the present invention relates to a process for continuously preparing a corresponding alicyclic oxime at a good yield by adding to cycloalkane a mixture solution of nitrosylsulfuric acid and sulfuric acid and hydrogen chloride, or by adding to cycloalkane saturated with hydrogen chloride a mixture solution of nitrosylsulfuric acid and sulfuric acid, stirring the mixture to obtain a homogeneous emulsion, and subjecting the emulsion to photochemical reaction at a temperature of from 0° to 50° C.

Conventionally, alicyclic oxime is photochemically prepared in such a wellknown manner as photochemically reacting a cycloalkane with nitrosyl chloride and hydrogen chloride (Japanese patent publication No. 5016/1953) or photochemically reacting a cycloalkane with nitrosylsulfuric acid crystals and hydrogen chloride (U.S. Pat. No. 28,128).

In the process using nitrosyl chloride, however, it is necessary to use such a nitrosyl chloride as specifically prepared and isolated. Also, in the process using nitrosylsulfuric acid crystals, it is necessary not only to prepare and isolate nitrosylsulfuric acid as a raw material, but also to conduct in batchwise for the purpose of raising the consumption of nitrosylsulfuric acid in photochemical reaction. Moreover, a vigorous stirring should be continued until nitrosylsulfuric acid crystals have disappeared, and furthermore, it is necessary to use anhydrous hydrogen chloride gas. From these reasons, the above processes were not desirable ones from the viewpoint of industrial advantages.

Further inconveniently, when any one of the above wellknown processes is used, a tar-like substance sticks to a wall of light source as photochemical reaction progresses to some extent, and hence the light energy is not effectively used (i.e., the yield of light energy is obliged to be lowered). Therefore, it is very difficult to continue the operation over a long while. In fact, there have been proposed various inventions to overcome this difficulty, for example, after photochemical reaction has been effected for a given period of time, the wall is washed, or an inert organic solvent is added to the reaction solution so that the tar-like substance adhering to the wall of light source may be dissolved and removed, or sulfuric acid is allowed to co-exist to remove the tar-like substance, or a specific light source and its arrangement are adopted for the purpose of controlling the formation and adhesion of the tar-like substance, or a brush is allowed to touch a transparent protective wall of the light source so that the tar-like substance may be removed. However, any one of these proposals is inevitably complicated, and difficulty arises inavoidably while continuing a smooth operation with the result that the production cost of a desired alicyclic oxime is raised, therefore these processes being not satisfactory from the industrial viewpoint.

As is well known, alicyclic oximes are important intermediate materials for the preparation of various organic compounds. Especially, cyclohexanone oxime is important as a raw material in obtaining caprolactam by Beckman rearrangement, and hence is especially important from the industrial viewpoint. Therefore, it is desirable in this field of industry to continuously prepare the alicyclic oxime with ease at low cost. In view of these circumstances, the present inventors have studied methods for obtaining alicyclic oximes from cycloalkanes at good yield, and as a result, have found a process by which photochemical reaction is continuously operated for a long time at a good yield, and formed the present invention.

According to the present invention, a mixture solution of nitrosylsulfuric acid and sulfuric acid containing 70 to 10% by weight, based on $NOHSO_4+H_2SO_4$, of $NOHSO_4$, and 2 to 25% by weight, based on $NOHSO_4+H_2SO_4+H_2O$, of $H_2O$, and hydrogen chloride are added to cycloalkane, or the above mixture solution of nitrosylsulfuric acid and sulfuric acid is added to cycloalkane saturated with hydrogen chloride, and the mixture solution thus obtained is stirred to produce a homogeneous emulsion, then the emulsion is fed to reactor, and subjected to photochemical reaction at a temperature of from 0° to 50° C. Thereby, a desired alicyclic oxime can be continuously prepared at high yield for a long while without any adhering of by produced tar-like substance to the wall.

According to the present invention, it becomes possible by maintaining reactants under the above mentioned conditions to carry out the continuous operation without adhering to the wall tar-like substances which decrease the amount of light energy with the result that disadvantageous points in the conventional methods are all overcome and unexpectedly excellent results can be attained. This is a quite surprising method, and when thinking of the above-mentioned disadvantages of conventional methods, the industrial advantages which will be brought about by the method of the present invention is considered immense: that is, it is unnecessary, according to the present invention, to purify and isolate nitrosylsulfuric acid which is to be used as a nitroso agent, and further, the formation of tar-like substance can be prevented, and moreover, the formed oxime and unreacted cycloalkane are conveniently separated, and this makes it easy to continuously take out the formed oxime to the outside of reaction system, and furthermore, as the reaction raw materials are continuously circled in whole, the photochemical reactor always contains fresh raw material fed therein. As is clear from the above facts, the disadvantages of the conventional method in photochemical reaction can be collectively resolved by the present invention.

The reaction conditions usable in the present invention will be individually explained below, and it is supposed that such advantageous points of the present invention as described above are due to the following characteristics. That is, nitrosyl chloride is formed in the present invention as a result of reaction of nitrosylsulfuric acid contained in a sulfuric acid drops homogeneously present in the reactor in the form of emulsion with hydrogen chloride contained in cycloalkane phase, and since the thus formed nitrosyl chloride immediately reacts photochemically with cycloalkane to produce oxime extremely near the surfaces of sulfuric acid drops, the concentration of the nitroso agent (i.e., nitrosyl chloride) contained in cycloalkane is not raised, therefore the formation of by-product produced by the existence of an excess amount of nitrosyl chloride dissolved in cycloalkane is controlled. The oxime formed by nitrosoation of cycloalkane is immediately extracted by sulfuric acid drops before the secondary reaction begins with the result that any tar-like substance is not formed.

In order to prove the mechanism of this formation of oxime in the present invention, we have analyzed the concentration of nitrosyl chloride contained in cycloalkane, and the amount of oxime remaining without being extracted with sulfuric acid drops. As the result, it has become clear that nitrosyl chloride is contained in cycloalkane in a very small amount, and also that the amount of oxime remaining without being extracted is very small. That is, the visible band absorption of nitrosyl chloride is hardly observed from cycloalkane present in the photochemical reactor (0.002% or below). This fact explains well that nitrosyl chloride produced from nitrosylsulfuric acid and hydrogen chloride is irradiated with radiations near the surface of sulfuric acid drops, and immediately forms the oxime. If the formation of oxime took place in a broad range of cycloalkane phase, the oxime which could not be immediately extracted with sulfuric acid drops was to be remained in cycloalkane phase. But such oxime is not found by quantitative analysis. From this fact, it has become clear that the formation of oxime also takes place near the surface of sulfuric acid drops in the same manner as the above-described formation of nitrosyl chloride. In other words, the present invention has, as is clear from the above, not only a negative effect to prevent the adhesion of the tar-like substance to the wall, but also has a positive effect to control the formation of the tar-like substances itself. These effect can not be attained by conventional methods which use an isolated nitrosyl chloride or nitrosylsulfuric acid crystals as raw materials.

A mixture solution of nitrosylsulfuric acid and sulfuric acid usable in the present invention is required to contain 70 to 10%, preferably 50 to 35% by weight, based on $H_2SO_4+NOHSO_4$, of $NOHSO_4$ and 2 to 25%, preferably 5 to 20% by weight, based on $H_2SO_4+NOHSO_4+H_2O$, of $H_2O$ so that a suitable photochemical reaction may be maintained. In practice, it is very convenient to use the mixture solution of nitrosylsulfuric acid and sulfuric acid obtained by allowing sulfuric acid to absorb the nitrose gas formed by the oxidation of $NH_3$ with air, but the mixture solution prepared by adding nitrosylsulfuric acid to sulfuric acid may be used. In the present invention, an ordinary swirl type pump stirrer, emulsifier or a combination of these may be used to produce the emulsion. The formed emulsion is preferably fallen downwardly from a top portion of a reactor.

The reaction temperature of the photochemical reaction of the present invention is suitably in the range of from 0° to 50° C., preferably 15° to 25° C. The reaction progresses even at temperatures outside of this range, but an undesirable result such that the reaction velocity is in some cases remarkably lowered or that the side reaction is promoted are observed.

Hydrogen chloride used in the present invention may be fed in either form of hydrogen chloride gas or an aqueous hydrochloric acid solution, and it depends upon the reaction conditions whether it is used in a form of gas or solution.

The object to use hydrogen chloride in the present invention is not to form an oxime hydrochloride, but to rapidly produce nitrosyl chloride by the reaction with nitrosylsulfuric acid. It is desirable to use hydrogen chloride in an amount sufficient to be saturated itself in cycloalkane phase and a great excess over the corresponding nitrosylsulfuric acid.

Hereinafter this invention will be explained in further detail.

In the method of the present invention, the limitation of the amount of nitrosylsulfuric acid, sudfuric acid and water mentioned above is a very important factor.

Because, it is desirable in the method of the present invention to rapidly produce nitrosyl chloride by contacting nitrosylsulfuric acid with hydrogen chloride. Whether nitrosyl chloride is formed readily or not depends upon the amount of water (i.e., the concentration of sulfuric acid), in which nitrosylsulfuric acid is dissolved or suspended. We have investigated the conversion of nitrosylsulfuric acid into nitrosyl chloride by dissolving nitrosylsulfuric acid crystals in sulfuric acid at each of concentrations as listed below, and obtaining an emulsion therefrom by mixing with cyclohexane which is saturated with a great excess of hydrogen chloride.

| Sulfuric acid, percent | [1] 100 | 98 | 95 | 80 | 70 |
|---|---|---|---|---|---|
| Conversion, percent | 45.3 | 63.5 | 85.3 | 88.6 | 63.7 |

[1] crystal.

As is clear from the above results, the conversion into nitrosyl chloride is low in the single use of nitrosylsulfuric acid crystals or in the use of 98% sulfuric acid. That is, the formed nitrosyl chloride react with sulfuric acid: $H_2SO_4+NOCl \rightarrow NOHSO_4+HCl$. On the other hand, the presence of a large amount of water, for example, in the use of 70% sulfuric acid is not desirable since it decomposes nitrosylsulfuric acid into nitrogen oxide and sulfuric acid or decomposes nitrosyl chloride into nitrous acid and hydrochloric acid.

The amount of sulfuric acid in the present invention has an influence on the rate and velocity of extraction of formed oxime. That is, in order to rapidly and at a good yield extract the formed oxime with sulfuric acid drops, it is better to use a large amount of sulfuric acid. In other words, the smaller the weight ratio of $NOHSO_4/NOHSO_4+H_2SO_4+H_2O$, the better. However, excess amount of sulfuric acid requires a large amount of alkali in the separation of oxime from sulfuric acid in the step after photochemical reaction, and hence the use of excess amount of sulfuric acid is not economical. We have found that the suitable weight ratio of $NOHSO_4/NOHSO_4+H_2SO_4+H_2O$ is 0.7 or below in order to easily feed the mixture solution of nitrosylsulfuric acid and sulfuric acid, and satisfactorily extract oxime with sulfuric acid. When the weight ratio is above 0.7, not only the continuous feeding of the mixture solution of nitrosylsulfuric acid and sulfuric acid is difficult, but also adhesion of the tar-like substance to the wall takes place as the operation progresses, to some extent and causes the gradual deposit of such oxime in the reaction solution as is not extracted with sulfuric acid drops.

The active radiations usable in the present invention may be any light having wave length in the range of 300–600 m$\mu$. For example, mercury lamps, sodium lamps. thallium lamps, etc. may be used.

Cycloalkanes usable in the present invention are suitably alicyclic alkanes such as cyclopentane, cyclohexane, cycloheptane, cyclooxtane, cyclododecane, etc.

Also, in the practice of the method of the present invention, inert organic solvents such as benzene, carbon tetrachloride, etc. may be present in the reaction system.

According to the method of the present invention, the formed oxime is taken out as sulfuric acid solution and subjected to after-treatment explained below.

In the case of isolation of the oxime from sulfuric acid solution with alkali, in order to avoid the heat caused during the neutralization of acidity of sulfuric acid or to avoid the local alkalization as much as possible, ammonium carbonate, preferably ammonium bicarbonate is used. In photochemical reaction, cycloalkane derivatives other than oxime is, in general, by-produced in a very small amount and is deposited in the cycling solution, but these byproducts are taken out of the cycling solution together with the unreacted cycloalkane, and removed in the purification of the unreacted cycloalkane. And, the purified unreacted cycloalkane can be again fed to the system and used.

The present invention will be illustrated below with examples.

EXAMPLE 1

A nitrose gas formed by the oxidation of ammonia with air is absorbed in sulfuric acid to prepare a mixture solution of nitrosylsulfuric acid and sulfuric acid containing 42.3% by weight of nitrosylsulfuric acid and 11% by weight of water. The mixture solution and cyclohexane saturated with hydrogen chloride kept at a temperature of 20±1° C. are fed at a rate of 100 g./min. and 80 kg./min. respectively, into the suction side of a swirl type pump so as to obtain an emulsion, and thus obtained emulsion is passed downwardly from a top portion of a photochemical reactor equipped with a 10 kw. high pressure mercury lamp, and then continuously withdrawn to a separator, where cyclohexane is separated from sulfuric acid containing produced cyclohexanone oxime, and the separated cyclohexane is recycled. On the other hand, the sulfuric acid containing produced cyclohexanone oxime is neutralized with ammonia at a temperature between 0 and 10° C.

As the result, cyclohexanone oxime is obtained at a yield based on NO of 89% by weight. When the weight ratio of $H_2O/H_2SO_4+NOHSO_4+H_2O$ (weight ratio) is varied as below, the yield based on NO are as follows:

| Number: | $H_2O/H_2SO_4$ plus $NOHSO_4$ plus $H_2O$ | Yield, percent by weight |
|---|---|---|
| 1-1¹ | 10.00 | 42.3 |
| 1-2 | 0.02 | 66.8 |
| 1-3 | 0.05 | 75.1 |
| 1-4 | 0.10 | 90.3 |
| 1-5 | 0.15 | 82.5 |
| 1-6 | 0.20 | 75.5 |
| 1-7 | 0.25 | 64.4 |
| 1-8 | 0.30 | 40.4 |

¹ Crystal.

EXAMPLE 2

A mixture solution of nitrosulfuric acid and sulfuric acid $(NOHSO_4/NOHSO_4+H_2SO_4:0.5, H_2O/NOHSO_4+H_2SO_4+H_2O:0.12)$ prepared in the same manner as in Example 1 is fed continuously at a rate of 120 g./min. into the reactor described in Example 1 to photochemically react with cyclohexane saturated with hydrogen chloride. This operation is continued for a long time. As the result, a yield, based on NO, of 80% by weight or above can be maintained over 100 hours, no deposit of a tar-like substance being observed at all.

On the other hand, a nitrosylsulfuric acid suspension in which nitrosylsulfuric acid crystals are suspended at a weight ratio of 0.9 based on $NOHSO_4$ and $H_2SO_4$, and a water content of 0.12 based on $NOHSO_4$, $H_2SO_4$ and $H_2O$ is fed continuously at a rate of 60 g./min. in the same manner described above. Unextracted cyclohexanone oxime appears in cyclohexane phase and increase in amount as time passes, with the result that the yield based on NO is gradually lowered. The adhesion of a tar-like substance to the wall of the lamp is observed.

| Irradiation time (hr.) | Yield based on NO, by weight | |
|---|---|---|
| | $NOHSO_4/NOHSO_4$ plus $H_2SO_4=0.5$ | $NOHSO_4/NOHSO_4$ plus $H_2SO_4=0.9$ |
| 10 | 83.2 | 81.0 |
| 20 | 84.9 | 75.3 |
| 30 | 89.6 | 63.1 |
| 40 | 85.5 | 53.2 |
| 50 | 85.8 | 47.8 |
| 100 | 87.3 | |

EXAMPLE 3

The operation in Example 1 is continued to maintain the yield, based on NO, of 85% by weight for 50 hours. Then, the pouring of the mixture solution of nitrosylsulfuric acid and sulfuric acid is terminated, but in place of this solution, nitrosyl chloride and 80% sulfuric acid solution are fed in succession at rates of 30 g./min., and 0.1 kg./min., respectively. The yield based on NO is lowered as below.

50 hours after the initiation of reaction—The yield based on NO 85% by weight.

55 hours after the initiation of reaction—The yield based on NO 58% by weight.

60 hours after the initiation of reaction—The yield based on NO 46% by weight.

Then the feeding of nitrosyl chloride and 80% sulfuric acid solution is terminated to again feed the mixture solution of nitrosylsulfuric acid and sulfuric acid, the yield is also slowly recovered to the previous level as below.

60.5 hours after reaction began—The yield based on NO 63% by weight.

61 hours after reaction began—The yield based on NO 74% by weight.

Beside, while nitrosyl chloride and 80% sulfuric acid solution were fed, the adhension of a tar-like substance to the wall were obviously observed.

EXAMPLE 4

Except that cyclooctane is used as a cycloalkane, the operation is conducted in the same manner as in Example 1. As the result, cyclooctanone oxime is obtained over 50 hours at a stable yield, based on NO, of 70–80% by weight.

EXAMPLE 5

Except that a cyclododecane and cyclohexane mixture solution having a molar ratio of 1:2 is used as a cycloalkane, the operation is conducted in the same manner as in Example 1. As the result, a mixture of cyclododecanone oxime and cyclohexanone oxime is obtained over 30 hours at a stable yield, based on NO, of 70–80% by weight. The molar ratio of the obtained oximes is about 1:2.

What we claim is:

1. A process for continuously preparing an alicyclic oxime characterized by adding to an cycloalkane solution of nitrosylsulfuric acid and sulfuric acid containing 70–10% by weight, based on $NOHSO_4+H_2SO_4$, of $NOHSO_4$ and 2–25% by weight, based on $$NOHSO_4+H_2SO_4+H_2O$$

of $H_2O$ together with hydrogen chloride, stirring the mixture to obtain a homogeneous emulsion, and thereafter subjecting the emulsion to photochemical reaction.

2. A process for continuously preparing an alicyclic oxime characterized by adding to an cycloalkane saturated with hydrogen chloride a solution of nitrosylsulfuric acid and sulfuric acid containing 70–10% by weight, based on $NOHSO_4 + H_2SO_4$, of $NOHSO_4$ and 2–25% by weight, based on $NOHSO_4 + H_2SO_4 + H_2O$, of $H_2O$, mixing with stirring to obtain a homogeneous emulsion, and thereafter subjecting the emulsion to photochemical reaction.

References Cited

UNITED STATES PATENTS

| | | | |
|---|---|---|---|
| Re. 25,937 | 12/1965 | Ito | 204—162 |
| 2,818,380 | 12/1967 | Welz | 204—162 |
| 3,047,482 | 7/1962 | Cheng et al. | 204—162 |

BENJAMIN R. PADGETT, Primary Examiner